US008044639B2

(12) United States Patent
Tamegai et al.

(10) Patent No.: US 8,044,639 B2
(45) Date of Patent: Oct. 25, 2011

(54) SELECTOR CIRCUIT

(75) Inventors: Yoichi Tamegai, Kyoto (JP); Ichiro Yokomizo, Kyoto (JP); Hironori Nakahara, Kyoto (JP)

(73) Assignee: Rohm Co., Ltd. (JP)

( * ) Notice: Subject to any disclaimer, the term of this patent is extended or adjusted under 35 U.S.C. 154(b) by 555 days.

(21) Appl. No.: 12/256,797

(22) Filed: Oct. 23, 2008

(65) Prior Publication Data

US 2009/0102427 A1    Apr. 23, 2009

(30) Foreign Application Priority Data

Oct. 23, 2007   (JP) ................................ 2007-275084

(51) Int. Cl.
*H02J 7/00*          (2006.01)
(52) U.S. Cl. .......................... 320/138; 320/114; 307/43
(58) Field of Classification Search .................. 320/103, 320/138, 163, 164; 307/43
See application file for complete search history.

(56) References Cited

U.S. PATENT DOCUMENTS

| | | | | |
|---|---|---|---|---|
| 5,557,188 A | * | 9/1996 | Piercey | 320/134 |
| 5,598,041 A | * | 1/1997 | Willis | 307/43 |
| 5,784,626 A | * | 7/1998 | Odaohara | 713/300 |
| 6,744,151 B2 | * | 6/2004 | Jackson et al. | 307/43 |
| 6,853,098 B1 | * | 2/2005 | Jackson et al. | 307/85 |
| 7,528,582 B1 | * | 5/2009 | Ferguson | 320/164 |
| 7,893,560 B2 | * | 2/2011 | Carter | 307/64 |

FOREIGN PATENT DOCUMENTS

| | | |
|---|---|---|
| JP | 9-284994 | 10/1997 |
| JP | 2002-218645 | 8/2002 |

* cited by examiner

*Primary Examiner* — Edward Tso
*Assistant Examiner* — Ramy Ramadan
(74) *Attorney, Agent, or Firm* — Cantor Colburn LLP

(57) ABSTRACT

A selector circuit outputs one of a first input voltage or a second input voltage via an output terminal. A first transistor and a second transistor are provided in series between a first input terminal and the output terminal. A third transistor and a fourth transistor are provided in series between a second input terminal and the output terminal. A control unit controls the ON/OFF operations of the first transistor through the fourth transistor. The back gates of the first transistor and the second transistor are connected such that at least one body diode of the first transistor M1 and at least one body diode of the second transistor are arranged in opposing directions. The back gates of the third transistor and the fourth transistor are connected in the same way.

9 Claims, 1 Drawing Sheet

SELECTOR CIRCUIT

BACKGROUND OF THE INVENTION

1. Field of the Invention

The present invention relates to a selector circuit which receives multiple input voltages, selects one of the input voltages thus received, and outputs the voltage thus selected.

2. Description of the Related Art

In recent years, electronic devices are known that receive power supply voltage from an external power supply and charge a built-in secondary battery using the power supply voltage. In some cases, such an electronic device includes multiple power supply input terminals for receiving the external power supply. For example, a cellular phone terminal includes a power supply input terminal for a cradle (desktop holder) and another power supply input terminal for an adapter, separately.

Such an electronic device requires a selector circuit which selects one of the power supply voltages supplied to the multiple power supply input terminals, and outputs the voltage thus selected to a charging circuit. For example, a technique is disclosed in Patent document 1, in which two diodes are provided such that the cathodes are connected to each other in the form of a common terminal, and the anodes of the two diodes are used as the power supply input terminals.

With such a circuit, the highest voltage is selected from among multiple power supply voltages, and the highest voltage thus selected is output. Furthermore, in a case in which a voltage is applied to one power supply input terminal and the other power supply input terminal is grounded, such a circuit prevents reverse current flow.

[Patent Document 1]
  Japanese Patent Application Laid Open No. H9-284994
[Patent Document 2]
  Japanese Patent Application Laid Open No. 2002-218645

However, the circuit described in Patent document 1 has a problem in that the output voltage is reduced from that of the input voltage by the forward voltage Vf of the diode. Furthermore, in a case in which the diodes are provided in the form of external components, such a circuit has another problem of an increase in the circuit area and an increased number of components.

SUMMARY OF THE INVENTION

The present invention has been made in view of the problems. Accordingly, it is a general purpose of the present invention to provide a selector circuit which selects one of multiple voltages, and outputs the selected voltage.

An embodiment of the present invention relates to a selector circuit. The selector circuit includes: a first input terminal via which a first input voltage is input from an external source; a second input terminal via which a second input voltage is input from another external source; an output terminal which outputs one of the first input voltage or the second input voltage; a first MOSFET (Metal Oxide Semiconductor Field Effect Transistor) and a second MOSFET, which are provided in series between the first input terminal and the output terminal; a third MOSFET and a fourth MOSFET, which are provided in series between the second input terminal and the output terminal; and a control unit which controls the ON/OFF operations of the first MOSFET and second MOSFET pair and the third MOSFET and fourth MOSFET pair. The back gates of the first and second MOSFETs are connected such that at least one body diode of the first MOSFET and at least one body diode of the second MOSFET are arranged in opposing directions. Furthermore, the back gates of the third and fourth MOSFETs are connected such that at least one body diode of the third MOSFET and at least one body diode of the fourth MOSFET are arranged in opposing directions.

Such an embodiment outputs the input voltage while suppressing voltage drop. Furthermore, in a state in which the first and second MOSFETs are in the ON state and the third and fourth MOSFETs are in the OFF state, or in a state in which the third and fourth MOSFETs are in the ON state and the first and second MOSFETs are in the OFF state, the diodes are arranged in opposing directions. This prevents reverse current flow.

Also, in a case in which the first input voltage is within a predetermined first voltage range, the control unit may switch the first and second MOSFETs to the ON state. Furthermore, in a case in which the first input voltage deviates from the first voltage range, and in a case in which the second input voltage is within a predetermined second voltage, the control unit may switch the third and fourth MOSFETs to the ON state.

Also, each of the upper limit level of the first voltage range and the upper limit level of the second voltage range may be set to a threshold voltage for overvoltage protection. Such an arrangement allows the selector circuit to have an overvoltage protection function.

Also, each of the lower limit level of the first voltage range and the lower limit level of the second voltage range may be set to a low-voltage lockout voltage. Such an arrangement allows the selector circuit to have a low-voltage lockout function.

With a selector circuit according to an embodiment, each of the first MOSFET through the fourth MOSFET may be an N-channel MOSFET. Also, the control unit may include: a first charge pump circuit configured such that, when an instruction is given to switch the first and second MOSFETs to the ON state, the first charge pump circuit steps up the first input voltage, and outputs the first input voltage thus stepped up to the gates of the first and second MOSFETs; and a second charge pump circuit configured such that, when an instruction is given to switch the third and fourth MOSFETs to the ON state, the second charge pump circuit steps up the second input voltage, and outputs the second input voltage thus stepped up to the gates of the third and fourth MOSFETs.

Also, the first charge pump circuit may perform a voltage step-up operation using the gate capacitance of the first MOSFET and the gate capacitance of the second MOSFET as output capacitors. Also, the second charge pump circuit may perform a voltage step-up operation using the gate capacitance of the third MOSFET and the gate capacitance of the fourth MOSFET as output capacitors. Such an arrangement does not require an output capacitor in the form of a separate unit, thereby reducing the circuit area.

Also, in a case in which the temperature exceeds a predetermined threshold value, the control unit may switch the first MOSFET through the fourth MOSFET to the OFF state. Such an arrangement allows the selector circuit to have a thermal shutdown function.

Also, the selector circuit may be monolithically integrated on a single semiconductor substrate. Examples of "arrangements monolithically integrated" include: an arrangement in which all the components of a circuit are formed on a semiconductor substrate; and an arrangement in which principal components of a circuit are integrally formed. Also, a part of the resistors, capacitors, and so fourth, for adjusting circuit constants, may be provided in the form of components external to the semiconductor substrate.

Another embodiment of the present invention relates to an electronic device. The electronic device includes: a first connector which allows a first external power supply to be detachably connected; a second connector which allows a second external power supply to be detachably connected; a secondary battery; any one of the above-described selector circuits; and a charging circuit. The first input terminal of the selector circuit is connected to the first connector, and the second input terminal thereof is connected to the second connector. The charging circuit charges the secondary battery using the output voltage of the selector circuit.

It is to be noted that any arbitrary combination or rearrangement of the above-described structural components and so fourth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
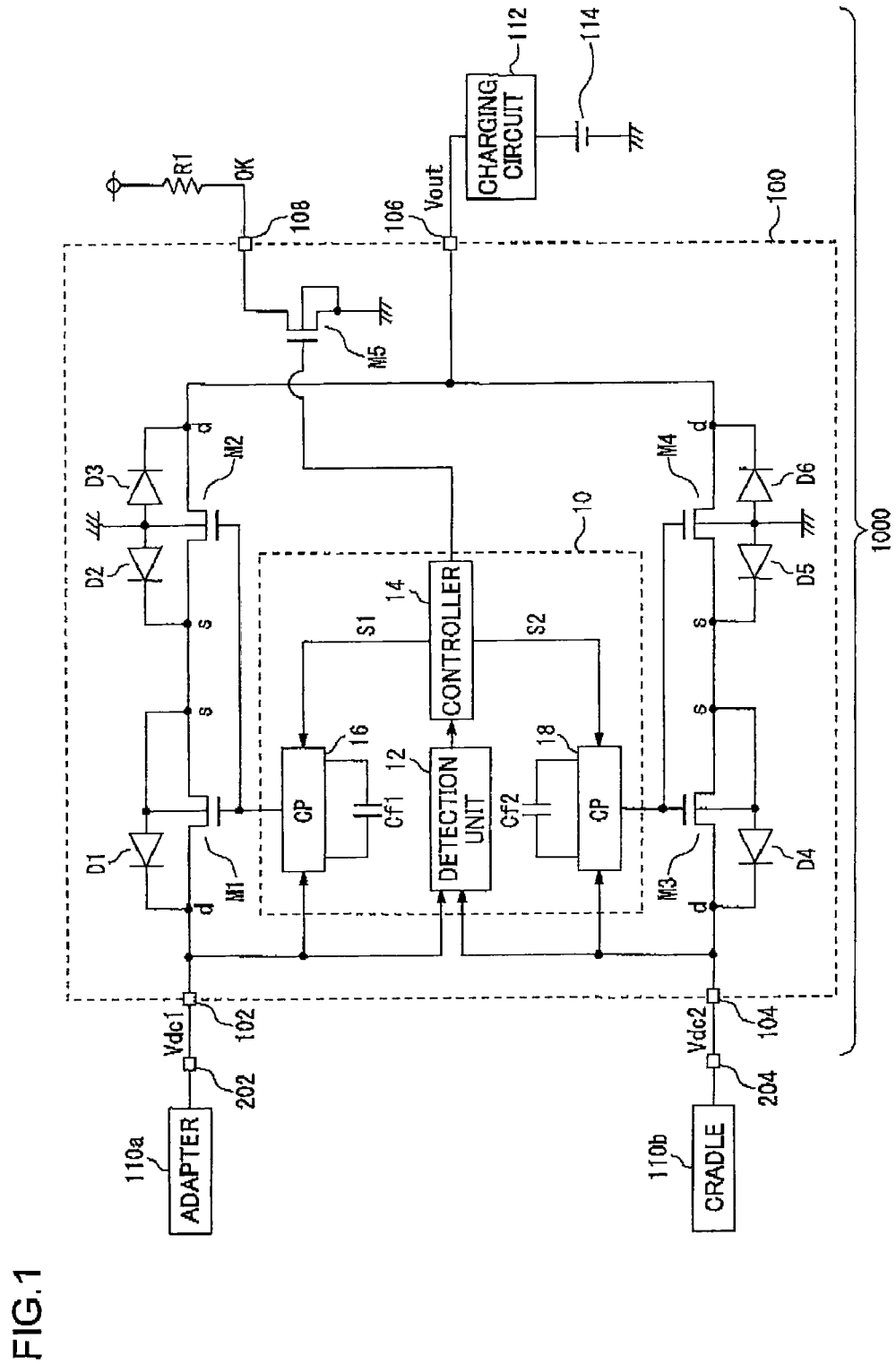
FIG. 1 is a circuit diagram which shows a configuration of a selector circuit and an overall configuration of an electronic device using the selector circuit according to an embodiment.

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes: a state in which the member A and the member B are physically and directly connected to each other; and a state in which the member A and the member B are indirectly connected to each other via another member that does not affect the electric connection therebetween.

In the same way, the state represented by the phrase "the member C is provided between the member A and the member B" includes a state in which these members are indirectly connected to each other via another member that does not affect the electric connection therebetween, in addition to the state in which the member A and the member C, or the member B and the member C are directly connected.

FIG. 1 is a circuit diagram which shows an overall configuration of a selector circuit 100 and an electronic device 1000 according to the embodiment.

The electronic device 1000 is a battery-driven information terminal device such as a cellular phone terminal, PDA, laptop PC, or the like. The electronic device 1000 includes the selector circuit 100, a charging circuit 112, and a battery 114. In addition, the electronic device 1000 further includes unshown digital circuits and analog circuits such as a CPU (Central Processing Unit), DSP (Digital Signal Processor), liquid crystal display, etc.

The battery 114 is a secondary battery such as a lithium-ion battery, NiCd (nickel-cadmium) battery, or the like. The battery voltage Vbat thereof is supplied to other circuit blocks in the electronic device 1000.

The electronic device 1000 includes a first connecter 202 which allows a first external power supply 110a to be detachably connected, and a second connecter 204 which allows a second external power supply 110b to be detachably connected. For example, each of the external power supplies 110a and 110b is an AC adapter which converts commercially-available IC voltage into DC voltage, or a standby power supply employing a DC/DC converter which steps down the voltage of a vehicle battery or the like, a USB power supply, a dry battery, or the like. Each of the external power supplies 110a and 110b supplies a DC power supply voltage Vdc to the battery 114.

In general, many electronic devices include an adapter terminal and a charging terminal for a cradle. In the present embodiment, the power supply 110a is an adapter power supply. The external power supply 110b is a cradle power supply. When the adapter power supply 110a is connected, a DC voltage (which will be referred to as the "first input voltage" hereafter) Vdc1 is applied to the first input terminal 102. Furthermore, when the cradle power supply 110b is connected, a DC voltage (which will be referred to as the "second input voltage" hereafter) Vdc2 is applied to the second input terminal 104.

The selector circuit 100 includes the first input terminal 102, the second input terminal 104, an output terminal 106, and a detection terminal 108, which are integrally formed on a single semiconductor substrate. The selector circuit 100 selects either the first input voltage Vdc1 or the second input voltage Vdc2, and outputs the input voltage thus selected via the output terminal 106.

The selector circuit 100 principally includes a first transistor M1 through fifth transistor M5, and a control unit 10.

The first transistor M1 and the second transistor M2 are N-channel MOSFETs, which are provided in series between the first input terminal 102 and the output terminal 106. Furthermore, the third transistor M3 and the fourth transistor M4 are N-channel MOSFETs, which are provided in series between the second input terminal 104 and the output terminal 106.

Each of the first transistor M1 and the third transistor M3 is a high-voltage DMOS (Double Diffused MOSFET). In this specification, for convenience of explanation, the terminal of the first transistor M1 on the first input terminal 102 side will be referred to as the "drain", and the terminal thereof on the second transistor M2 side will be referred to as the "source". Also, the terminal of the third transistor M3 on the second input terminal 104 side will be referred to as the "drain", and the terminal thereof on the fourth transistor M4 side will be referred to as the "source".

Each of the back gates of the first transistor M1 and the third transistor M3 is connected to the corresponding source thereof. Accordingly, a first body diode D1 is formed between the back gate of the first transistor M1 and the first input terminal 102 such that the cathode of the first body diode D1 is on the first input terminal 102 side. Similarly, a fourth body diode D4 is formed between the back gate of the third transistor M3 and the second input terminal 104 such that the cathode of the fourth body diode D4 is on the second input terminal 104 side.

Each of the second transistor M2 and the fourth transistor M4 is a low-resistance N-channel MOSFET. In this specification, for convenience of explanation, the terminal of the second transistor M2 on the output terminal 106 side will be referred to as the "drain", and the terminal thereof on the first transistor M1 side will be referred to as the "source". Also, the terminal of the fourth transistor M4 on the output terminal 106 side will be referred to as the "drain", and the terminal thereof on the third transistor M3 side will be referred to as the "source".

With the present embodiment, the back gate of each of the second transistor M2 and the fourth transistor M4 is grounded. Accordingly, a second body diode D2 is formed between the back gate of the second transistor M2 and the source of the first transistor M1, such that the cathode of the second body diode D2 is on the first transistor M1 side. Also, a third body diode D3 is formed between the back gate of the second transistor M2 and the output terminal 106, such that the cathode of the third body diode D3 is on the output terminal 106 side. Similarly, a fifth body diode D5 is formed between the back gate of the fourth transistor M4 and the source of the third transistor M3, such that the cathode of the fifth body diode D5 is on the third transistor M3 side. Also, a sixth body diode D6 is formed between the back gate of the fourth transistor M4 and the output terminal 106, such that the cathode of the sixth body diode D6 is on the output terminal 106 side.

That is to say, the connection of the back gate of the first transistor M1 and the connection of the back gate of the second transistor M2 are formed such that at least one body diode of the first transistor M1, i.e., the first body diode D1, and at least one body diode of the second transistor M2, i.e., the body diode D3, are arranged in opposing directions. Furthermore, the connection of the back gate cf the third transistor M3 and the connection of the back gate of the fourth transistor M4 are formed such that at least one body diode of the third transistor M3, i.e., the body diode D4, and at least one body diode of the fourth transistor M4, i.e., the body diode D6, are arranged in opposing directions.

The control unit 10 controls the ON/OFF operations of the first transistor M1 and second transistor M2 pair, and the third transistor M3 and fourth transistor M4 pair.

The control unit 10 includes a detection unit 12, a controller 14, a first charge pump circuit 16, and a second charge pump circuit 18. Of the first input voltage Vdc1 and the second input voltage Vdc2, the higher of the two may be supplied as the power supply voltage to the detection unit 12 and the controller 14. Specifically, an arrangement may be made in which two diodes are provided such that the cathodes thereof are connected as a common cathode, and such that the first input voltage Vdc1 is applied to one anode thereof, and the second input voltage Vdc2 is applied to the other anode thereof, and the voltage generated at the common cathode is used as the power supply voltage.

The detection unit 12 monitors the first input voltage Vdc1 and the second input voltage Vdc2, and judges whether or not the first input voltage Vdc1 and the second input voltage Vdc2 are within a predetermined first voltage range and a predetermined second voltage range, respectively. In a case in which the first input voltage Vdc1 is within the predetermined first voltage range, the controller 14 switches the first transistor M1 and the second transistor M2 to the ON state, and switches the third transistor M3 and the fourth transistor M4 to the OFF state. Also, in a case in which the first input voltage Vdc1 deviates from the first voltage range, and the second input voltage Vdc2 is within the second voltage range, the controller 14 switches the third transistor M3 and the fourth transistor M4 to the ON state, and switches the first transistor M1 and the second transistor 142 to the OFF state. The first voltage range and the second voltage range are preferably set to the same range. The first voltage range and the second voltage range will simply be referred to as the "voltage range" hereafter.

The lower limits of the first voltage range and the second voltage range are set to a voltage (low-voltage lockout voltage Vuvlo) at which the charging circuit 112 can charge the battery 114. When the first input voltage Vdc1 exceeds the low-voltage lockout voltage Vuvlo, the first transistor M1 and the second transistor M2 are switched to the ON state, thereby supplying the first input voltage Vdc1 to the charging circuit 112 via the output terminal 106. Also, when the second input voltage Vdc2 exceeds the low-voltage lockout voltage Vunlo in a state in which the first input voltage Vdc1 deviates from the first voltage range, the third transistor M3 and the fourth transistor M4 are switched to the ON state, thereby supplying the second input voltage Vdc2 to the charging circuit 112 via the output terminal 106.

Furthermore, the upper limits of the first voltage range and the second voltage range are preferably set to a threshold voltage (overvoltage protection voltage Vovp) for overvoltage protection. The overvoltage protection voltage Vovp is set giving consideration to the voltage resistance of the charging circuit 112. Such an arrangement protects the charging circuit 112 from being supplied with voltage exceeding the overvoltage protection voltage Vovp. That is to say, from a different perspective, the selector circuit 100 provides a function as an overvoltage protection circuit.

Furthermore, the control unit 10 has a thermal shutdown function in which, in a case in which the temperature of the selector circuit 100 exceeds a threshold value, the first transistor M1 through the fourth transistor M4 are switched to the OFF state.

The detection unit 12 compares the first input voltage Vdc1 with the first voltage range, and compares the second input voltage Vdc2 with the second voltage comparison range. Furthermore, the detection unit 12 monitors the temperature of the selector circuit 100. With reference to the voltage comparison results and the temperature monitoring results, the controller 14 determines which of the first transistor M1 and second transistor M2 pair and the third transistor M3 and fourth transistor M4 pair should be switched to the ON state.

The first input voltage Vdc1 is input to the first charge pump circuit 16. Furthermore, a control signal S1 is input to the first charge pump circuit 16 from the controller 14. When the first charge pump circuit 16 receives an instruction to switch the first transistor M1 and the second transistor M2 to the ON state, the first charge pump circuit 16 steps up the first input voltage Vdc1, and supplies the voltage thus stepped up to the gates of the first transistor M1 and the second transistor M2. When the voltage thus stepped up is applied to the first transistor M1 and the second transistor M2, the gate-source voltages of the first transistor M1 and the second transistor M2 exceed the threshold voltage Vt, thereby switching the first transistor M1 and the second transistor M2 to the ON state.

The second input voltage Vdc2 and a control signal S2 are input to the second charge pump circuit 18. When the second charge pump circuit 18 receives an instruction to switch the third transistor M3 and the fourth transistor M4 to the ON state, the second charge pump circuit 18 steps up the second input voltage Vdc2, and supplies the voltage thus stepped up to the gates of the third transistor M3 and the fourth transistor M4.

In general, charge pump circuits include a flying capacitor and an output capacitor. With the present embodiment, the first charge pump circuit 16 includes a first flying capacitor Cf1 in the form of a MIM capacitance. Furthermore, the first charge pump circuit 16 performs the step-up operation using the gate capacitance of the first transistor M1 and the gate capacitance of the second transistor M2 as the output capacitor. That is to say, in the first charge pump circuit 16, the output capacitor is not provided in the form of a separate unit.

In the same way, the second charge pump circuit 18 includes a second flying capacitor Cf2 in the form of a MIM capacitance. The gate capacitance of the third transistor M3 and the fourth transistor M4 are used as the output capacitor. Such a configuration allows the selector circuit 100 to be integrally formed without involving capacitors in the form of external components.

In a case in which at least one of the first input voltage Vdc1 and the second input voltage Vdc2 is within the predetermined voltage range, the controller 14 generates a control signal S3 at the high level. The control signal S3 is input to the gate of the fifth transistor M5, which is an N-channel MOSFET. With regard to the fifth transistor M5, the source thereof is grounded, and the drain thereof is connected to the detection terminal 108. The fifth transistor M5 is provided as an open drain system. The detection terminal 108 is connected to a pull-up resistor R1. The drain voltage of the fifth transistor M5 is output externally as a flag signal FLAG. The flag signal FLAG can be used by a circuit block other than the selector circuit 100 as a flag which indicates whether or not normal voltage supply is being performed for the electronic device 1000.

Description will be made regarding the operation of the selector 100 described above.

(1) A case in which the first input voltage Vdc1 is within the predetermined voltage range.

In this case, the first transistor M1 and the second transistor M2 are switched to the ON state, and the output voltage Vout =Vdc1 is output via the output terminal 106.

In this state, in a case in which the second input terminal 104 is grounded, or in a case in which unintended voltage is applied to the second input terminal 104, a certain voltage is applied between the output terminal 106 and the second input terminal 104. Even in a case in which such an abnormal state occurs in the circuit, the third transistor M3 and the fourth transistor M4 are in the OFF state, thereby ensuring that no current flows through the channel. Furthermore, the sixth body diode D6 and the fourth body diode D4 are provided in opposing directions, and accordingly, there is no current path, except for the channel. Thus, such an arrangement prevents reverse current flow from the output terminal 106 to the second input terminal 104.

Furthermore, in the state (1), the flag signal FLAG is set to the low level.

(2) In a case in which the first input voltage Vdc1 deviates from the predetermined voltage range, and the second input voltage Vdc2 is within the predetermined voltage.

In this case, the third transistor M3 and the fourth transistor M4 are switched to the ON state, thereby outputting the output voltage Vout=Vdc2 via the output terminal 106.

In this state, in a case in which the first input terminal 102 is grounded, or in a case in which unintended voltage is applied, a certain voltage is applied between the output terminal 106 and the first input terminal 102. Even in a case in which such an abnormal state occurs in the circuit, the first transistor M1 and the second transistor M2 are in the OFF state, thereby ensuring that no current flows through the channel. Furthermore, the third body diode D3 and the first body diode D1 are provided in opposing directions, and accordingly, there is no current path, except for the channel. Thus, such an arrangement prevents reverse current flow from the output terminal 106 to the first input terminal 102.

Furthermore, in the state (2), the flag signal FLAG is set to the low level, as in the state (1).

(3) In a case in which both the first input voltage Vdc1 and the second input voltage Vdc2 deviate from the predetermined voltage range.

In this case, the first transistor M1 through the fourth transistor M4 are all switched to the OFF state, and accordingly, no voltage is supplied to the charging circuit 112. In this case, the flag signal FLAG is set to the high level.

By designing the first transistor M1 through the fourth transistor M4 such that they have small ON resistances, the selector circuit 100 shown in FIG. 1 outputs multiple input voltages Vdc1 and Vdc2 with a small voltage drop, as compared with conventional voltage selectors employing multiple diodes such that the cathodes are connected as a common cathode. Furthermore, the selector circuit 100 provides reduced power consumption. Furthermore, by providing the second transistor M2 and the fourth transistor M4 such that they use the body diodes, the selector circuit 100 prevents reverse current flow.

The embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the scope of the present invention.

Description has been made in the embodiment regarding an arrangement in which the selector circuit 100 and the charging circuit 112 are provided in the form of separate ICs. Also, these components may be monolithically integrated as a power management IC. Conversely, the selector circuit 100 also may be provided in the form of a discrete component.

Description has been made regarding an arrangement in which each of the back gates of the second transistor M2 and the fourth transistor M4 is grounded. Also, the back gates of the second transistor M2 and the fourth transistor M4 may be connected to the terminal (source) on the first transistor M1 side and the terminal (source) on the third transistor M3 side, respectively. With such an arrangement, the body diode D3 and the first body diode D1 are provided in opposing directions, and the sixth body diode D6 and the fourth body diode D4 are in opposing directions, thereby preventing reverse current flow.

Also, each of the first transistor M1 through the fourth transistor M4 may be provided in the form of a P-channel MOSFET. For example, each of the second transistor M2 and the fourth transistor M4 may be provided in the form of a P-channel MOSFET. With such an arrangement, the back gates thereof should be connected to the output terminal 106. In this case, the second body diode D2 and the first body diode D1 are provided in opposing directions, and the fifth body diode D5 and the fourth body diode D4 are provided in opposing directions, thereby preventing reverse current flow.

Also, each of the first transistor M1 and the third transistor M3 may be provided in the form of a P-channel MOSFET. Such an arrangement does not require a high voltage for switching the first transistor M1 and the third transistor M3 to the ON state. Accordingly, such an arrangement does not require the first charge pump circuit 16 and the second charge pump circuit 18, and thus provides a simple circuit configuration.

Depending upon the semiconductor manufacturing process employed, in some cases, there is no need to connect the back gate of each high-voltage MOSFET to the source thereof. With such an arrangement, by providing each of the second transistor M2 and the fourth transistor M4 shown in FIG. 1 in the form of a high-voltage resistant component, the first transistor M1 and the third transistor M3 can be eliminated, thereby reducing the circuit area. The concept of the technique encompassed in this modification and the overvoltage protection circuit shown in FIG. 1 can be understood as follows.

An overvoltage protection circuit according to an embodiment includes a first input terminal 102 which allows the first input voltage Vdc1 to be input from an external source, a second input terminal 104 which allows the second input voltage Vdc2 to be input from another external source, an output terminal 106 which allows either of the second input voltages Vdc1 or Vdc2 to be output, a first MOSFET group including at least one MOSFET, which is provided between the first input terminal 102 and the output terminal 106, a second MOSFET group including at least one MOSFET, which is provided between the second input terminal 104 and the output terminal 106, and a control unit which controls the ON/OFF operations of the first and second MOSFET groups. The back gate connection of the first MOSFET group is made such that the first body diode of any one MOSFET provided between the first input terminal 102 and the output terminal 106 and the second body diode of any one MOSFET provided between the first input terminal 102 and the output terminal 106 are arranged in opposing directions. Furthermore, the back gate connection of the second MOSFET group is made such that the third body diode of any one MOSFET provided between the second input terminal 104 and the output terminal 106 and the fourth body diode of any one MOSFET provided between the second input terminal 104 and the output terminal 106 are arranged in opposing directions.

Description has been made in the embodiment regarding an arrangement in which, in a case in which both the first input voltage Vdc1 and the second input voltage Vdc2 are within a predetermined voltage range, the first input voltage Vdc1 is output as a preferred output. However, the present invention is not restricted to such an arrangement. For example, an arrangement may be made in which, in a case in which both the first input voltage Vdc1 and the second input voltage Vdc2 are within a predetermined voltage range, determination is made that an abnormal state has occurred, and the first transistor M1 through the fourth transistor M4 are all switched to the OFF state.

Description has been made in the embodiment regarding an arrangement in which, in a case in which the input voltage exceeds the upper limit of the predetermined voltage range, the first transistor M1 through the fourth transistor M4 are switched to the OFF state. Alternatively, in this case, the level of the ON state of each transistor may be reduced. With such an arrangement, the output voltage Vout may be maintained at a constant voltage by adjusting the gate voltage for either of the first transistor M1 or the second transistor M2, using the output voltage Vout as a feedback signal. Also, the output voltage Vout may be maintained at a constant voltage by adjusting the gate voltage for either of the third transistor M3 or the fourth transistor M4. That is to say, a linear regulator may be provided using either the first transistor M1 or the second transistor M2. Also, a linear regulator may be provided using either the third transistor M3 or the fourth transistor M4.

Description has been made in the embodiment regarding an arrangement having two inputs and one output. Also, an arrangement may be made having three or more inputs.

While the preferred embodiments of the present invention have been described using specific terms, such description is for illustrative purposes only, and it is to be understood that changes and variations may be made without departing from the spirit or scope of the appended claims.

What is claimed is:

1. A selector circuit including:
   a first input terminal via which a first input voltage is input from an external source;
   a second input terminal via which a second input voltage is input from another external source;
   an output terminal which outputs one of the first input voltage or the second input voltage;
   a first MOSFET (Metal Oxide Semiconductor Field Effect Transistor) and a second MOSFET, which are provided in series between the first input terminal and the output terminal;
   a third MOSFET and a fourth MOSFET, which are provided in series between the second input terminal and the output terminal; and
   a control unit which controls the ON/OFF operations of the first MOSFET and second MOSFET pair and the third MOSFET and fourth MOSFET pair,
   wherein a connection of a back gate of the first MOSFET and a connection of a back gate of the second MOSFET are formed such that at least one body diode of the first MOSFET and at least one body diode of the second MOSFT are arranged in opposing directions,
   wherein a connection of a back gate of the third MOSFET and a connection of a back gate of the fourth MOSFET are formed such that at least one body diode of the third MOSFET and at least one body diode of the fourth MOSFET are arranged in opposing directions; and
   wherein the control unit comprises:
   a first charge pump circuit configured such that, when an instruction is given to switch the first and second MOSFETs to the ON state, the first charge pump circuit steps up the first input voltages and outputs the first input voltage thus stepped up to the gates of the first and second MOSFETs; and
   a second charge pump circuit configured such that, when an instruction is given to switch the third and fourth MOSFETs to the ON state, the second charge pump circuit steps up the second input voltage, and outputs the second input voltage thus stepped up to the gates of the third and fourth MOSFETs.

2. A selector circuit according to claim 1, wherein, in a case in which the first input voltage is within a predetermined first voltage range, the control unit switches the first and second MOSFETs to the ON state,
   and wherein, in a case in which the first input voltage deviates from the first voltage range, and in a case in which the second input voltage is within a predetermined second voltage, the control unit switches the third and fourth MOSFETs to the ON state.

3. A selector circuit according to claim 2, wherein each of the upper limit level of the first voltage range and the upper limit level of the second voltage range is set to a threshold voltage for overvoltage protection.

4. A selector circuit according to claim 2, wherein each of the lower limit level of the first voltage range and the lower limit level of the second voltage range is set to a low-voltage lockout voltage.

5. A selector circuit according to claim 1, wherein each of the first MOSFET through the fourth MOSFET is an N-channel MOSFET.

6. A selector circuit according to claim 5, wherein the first charge pump circuit performs a voltage step-up operation using the gate capacitance of the first MOSFET and the gate capacitance of the second MOSFET as output capacitors,
   and wherein the second charge pump circuit performs a voltage step-up operation using the gate capacitance of the third MOSFET and the gate capacitance of the fourth MOSFET as output capacitors.

7. A selector circuit according to claim 1, wherein, in a case in which the temperature exceeds a predetermined threshold value, the control unit switches the first MOSFET through the fourth MOSFET to the OFF state.

8. A selector circuit according to claim 1, which is integrally formed on a single semiconductor substrate.

9. An electronic device including:
   a first connector which allows a first external power supply to be detachably connected;
   a second connector which allows a second external power supply to be detachably connected;
   a secondary battery;
   a selector circuit according to claim 1, configured such that the first connector is connected to the first input terminal, and such that the second connecter is connected to the second terminal; and
   a charging circuit which charges the secondary battery using the output voltage of the selector circuit.

* * * * *